United States Patent
Hara et al.

(10) Patent No.: US 11,458,959 B2
(45) Date of Patent: Oct. 4, 2022

(54) PARKING ASSIST SYSTEM

(71) Applicant: HONDA MOTOR CO., LTD., Tokyo (JP)

(72) Inventors: Yuki Hara, Saitama (JP); Yasushi Shoda, Saitama (JP); Yuki Nakada, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 201 days.

(21) Appl. No.: 16/875,512

(22) Filed: May 15, 2020

(65) Prior Publication Data
US 2020/0398822 A1     Dec. 24, 2020

(30) Foreign Application Priority Data
Jun. 24, 2019   (JP) ............... JP2019-116685

(51) Int. Cl.
*B60W 30/06*   (2006.01)
*B60W 60/00*   (2020.01)
(Continued)

(52) U.S. Cl.
CPC ............ *B60W 30/06* (2013.01); *B60W 30/09* (2013.01); *B60W 30/0956* (2013.01);
(Continued)

(58) Field of Classification Search
CPC .. B60W 30/06; B60W 30/09; B60W 30/0956; B60W 60/0025; B60W 2540/12; B60W 2555/00; G08G 1/168
See application file for complete search history.

(56) References Cited

U.S. PATENT DOCUMENTS

2005/0270177 A1*  12/2005  Mori ................... B60T 7/12
                                                340/932.2
2016/0139598 A1    5/2016  Ichikawa et al.
                      (Continued)

FOREIGN PATENT DOCUMENTS

JP     2009294897 A     12/2009
JP     2015209171 A     11/2015
                (Continued)

OTHER PUBLICATIONS

Notice of Reasons for Refusal for Patent Application JP 2019-116685 dated Feb. 22, 2022; 12 pp.

*Primary Examiner* — Anshul Sood
(74) *Attorney, Agent, or Firm* — Armstrong Teasdale LLP

(57) ABSTRACT

A parking assist system includes: a control device configured to control an autonomous parking operation to move a vehicle autonomously to a prescribed target parking position; and a vehicle state detecting device configured to detect a state of the vehicle. During control of the parking operation, when the control device determines that the state of the vehicle detected by the vehicle state detecting device is a prohibition state in which the parking operation should be prohibited, the control device executes a prohibition deceleration process to decelerate the vehicle so as to stop the vehicle. The control device is configured to set an upper limit on deceleration of the vehicle in the prohibition deceleration process to be larger than an upper limit on deceleration of the vehicle in a stop operation to stop the vehicle at the target parking position.

9 Claims, 7 Drawing Sheets

(51) Int. Cl.
*G08G 1/16* (2006.01)
*B60W 30/095* (2012.01)
*B60W 30/09* (2012.01)

(52) U.S. Cl.
CPC ......... *B60W 60/0025* (2020.02); *G08G 1/168* (2013.01); *B60W 2540/12* (2013.01); *B60W 2555/00* (2020.02)

(56) References Cited

U.S. PATENT DOCUMENTS

| | | | |
|---|---|---|---|
| 2016/0264137 A1* | 9/2016 | Lavoie | B60T 7/22 |
| 2018/0208245 A1* | 7/2018 | Mizutani | B60W 30/06 |
| 2018/0257665 A1 | 9/2018 | Sannodo | |
| 2018/0265079 A1 | 9/2018 | Nakada | |
| 2019/0023241 A1 | 1/2019 | Kumagai et al. | |
| 2020/0359547 A1* | 11/2020 | Sakaguchi | B60W 50/082 |

FOREIGN PATENT DOCUMENTS

| | | | |
|---|---|---|---|
| JP | 2016099713 A | 5/2016 |
| JP | 2016199104 A | 12/2016 |
| JP | 2018144751 A | 9/2018 |
| JP | 2018150012 A | 9/2018 |
| JP | 2019014308 A | 1/2019 |
| JP | 2019018733 A | 2/2019 |
| JP | 2019043174 A | 3/2019 |

* cited by examiner

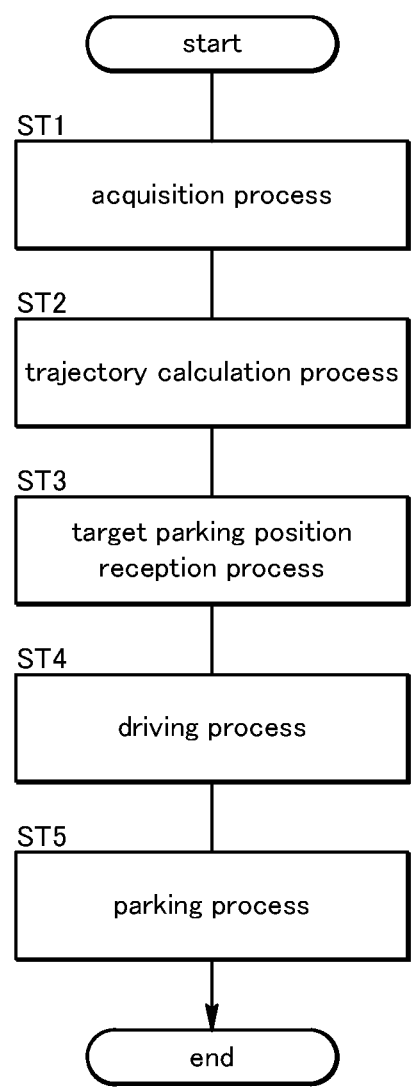

PARKING ASSIST SYSTEM

TECHNICAL FIELD

The present invention relates to a parking assist system configured to move a vehicle autonomously and park the vehicle.

BACKGROUND ART

There is a known vehicle control device that automatically controls a vehicle in accordance with a driver's instruction so as to execute automatic parking assistance to place the vehicle at a target parking position (for example, JP2019-43174A). This vehicle control device suspends the automatic parking assistance when a prescribed suspension condition (for example, an appearance of a new obstacle) that requires suspension of the automatic parking assistance is satisfied. Thereafter, the vehicle control device presents an occupant with an executable next operation, such as the resumption of the automatic parking assistance, to an occupant.

In a parking assist system configured to move a vehicle autonomously and park the vehicle, it is preferable that the deceleration of the vehicle during autonomous traveling be limited to a prescribed threshold or less from the viewpoint of comfort. However, if the deceleration of the vehicle is always limited to the threshold or less, the vehicle may not be quickly decelerated when it is not appropriate to continue an autonomous parking operation of the vehicle (for example, when a new obstacle appears).

SUMMARY OF THE INVENTION

In view of such a problem of the prior art, a primary object of the present invention is to provide a parking assist system that is configured to move a vehicle autonomously and park the vehicle and can decelerate the vehicle quickly when it is not appropriate to continue an autonomous parking operation of the vehicle.

To achieve such an object, one embodiment of the present invention provides a parking assist system (1), including a control device (15) configured to control an autonomous parking operation to move a vehicle autonomously to a prescribed target parking position; and a vehicle state detecting device (12, 13) configured to detect a state of the vehicle, wherein during control of the parking operation, when the control device determines that the state of the vehicle detected by the vehicle state detecting device is a prohibition state in which the parking operation should be prohibited, the control device executes a prohibition deceleration process to decelerate the vehicle so as to stop the vehicle, and the control device is configured to set an upper limit on deceleration of the vehicle in the prohibition deceleration process to be larger than an upper limit on deceleration of the vehicle in a stop operation to stop the vehicle at the target parking position.

According to this arrangement, when the vehicle is in the prohibition state in which the autonomous parking operation should be prohibited, the vehicle is decelerated by the prohibition deceleration process. The upper limit on the deceleration of the vehicle at this time is set to be larger than the upper limit on the deceleration of the vehicle in the stop operation to stop the vehicle at the target parking position. Accordingly, when the autonomous parking operation of the vehicle should be prohibited, the vehicle can be decelerated more quickly.

Preferably, the control device is configured to set an upper limit on a change rate of the deceleration of the vehicle in the prohibition deceleration process to be larger than an upper limit on a change rate of the deceleration of the vehicle in the stop operation to stop the vehicle at the target parking position.

According to this arrangement, the upper limit on the change rate of the deceleration of the vehicle in the prohibition state is set to be larger than the upper limit on the change rate of the deceleration of the vehicle in the stop operation to stop the vehicle at the target parking position (namely, the upper limit set in consideration of comfort). Accordingly, when the autonomous parking operation of the vehicle should be prohibited, the vehicle can be decelerated more quickly.

Preferably, the control device is configured to set the upper limit on the deceleration of the vehicle in the prohibition deceleration process to be larger than an upper limit on deceleration of the vehicle in a switching operation for switching a travel direction of the vehicle during the parking operation.

According to this arrangement, the upper limit on the deceleration of the vehicle in the prohibition state is set to be larger than the upper limit on the deceleration of the vehicle in the switching operation during the autonomous parking operation (namely, the upper limit set in consideration of comfort). Accordingly, when the autonomous parking operation of the vehicle should be prohibited, the vehicle can be decelerated more quickly.

Preferably, the parking assist system further includes an external environment information acquisition device (7) configured to acquire surrounding information of the vehicle, wherein during the control of the parking operation, when the external environment information acquisition device detects an obstacle in a travel direction of the vehicle, the control device executes an urgent deceleration process to stop the vehicle, and the control device is configured to set an upper limit on deceleration of the vehicle in the urgent deceleration process to be larger than the upper limit on the deceleration of the vehicle in the prohibition deceleration process.

According to this arrangement, the upper limit on the deceleration of the vehicle when the obstacle is detected in the travel direction during the autonomous parking operation is set to be larger than the upper limit on the deceleration of the vehicle in the prohibition state and the upper limit on the deceleration of the vehicle in the stop operation to stop the vehicle at the target parking position. Accordingly, when the obstacle is detected in the travel direction and there is a possibility of a collision with the obstacle, the vehicle can be decelerated quickly at the deceleration greater than the deceleration in the prohibition deceleration process (namely, the deceleration set in consideration of safety).

Preferably, the control device is configured to set an upper limit on a change rate of the deceleration of the vehicle in the urgent deceleration process to be larger than an upper limit on a change rate of the deceleration of the vehicle in the prohibition deceleration process.

According to this arrangement, the upper limit on the change rate of the deceleration of the vehicle when the obstacle is detected in the travel direction during the autonomous parking operation is set to be larger than the upper limit on the change rate of the deceleration of the vehicle in the prohibition state and the upper limit on the change rate of the deceleration of the vehicle in the stop operation to stop the vehicle at the target parking position. Accordingly, when the obstacle is detected in the travel direction and there is a possibility of a collision with the obstacle, the vehicle can be decelerated quickly at the deceleration greater than the deceleration in the prohibition deceleration process (namely, the deceleration set in consideration of safety).

Preferably, during the control of the parking operation, when the control device determines that the vehicle is in a state where a door is opened or a seat belt is released based on a detection result of the vehicle state detecting device, the control device stops the vehicle by executing the prohibition deceleration process, and thereafter, the control device allows the parking operation to resume when the control device determines that the vehicle is in a state where the door is closed and the seat belt is fastened based on the detection result of the vehicle state detecting device.

According to this arrangement, when the occupant releases the seat belt or opens the door, the vehicle is stopped. This enhances safety of the vehicle during the autonomous parking operation. Thereafter, when the seat belt is fastened and the door is closed, the autonomous parking operation is resumed, so that the vehicle can be more convenient.

Preferably, during the control of the parking operation, when the control device determines that the vehicle is in a state where a door is opened and a seat belt is released based on a detection result of the vehicle state detecting device, the control device cancels the parking operation.

The action to release the seat belt and open the door can be regarded as the occupant's intention to cancel the autonomous parking operation. According to the above arrangement, the autonomous parking operation is canceled when the seat belt is released and the door is opened, so that it is possible to realize the autonomous parking operation which corresponds to the occupant's intention and is more convenient.

Preferably, the parking assist system further includes: an input/output device (14) configured to present information to an occupant and to receive an input by the occupant; and a brake input member (24) configured to receive a brake operation of the vehicle by the occupant, wherein after the control device stops the vehicle by executing the prohibition deceleration process, the input/output device receives the input as to whether to resume the parking operation when the brake operation on the brake input member is detected.

According to this arrangement, after the vehicle is stopped, when the brake operation on the brake input member is detected, the input/output device receives the input as to whether to resume the autonomous parking operation. That is, on condition that the brake operation on the brake input member is performed, the selection operation to resume the autonomous parking operation becomes possible. Accordingly, the occupant can resume the autonomous parking operation after checking the surroundings and taking a posture to stop the vehicle appropriately.

Thus, according to one embodiment of the present invention, it is possible to provide a parking assist system that is configured to move a vehicle autonomously and park the vehicle and can decelerate the vehicle quickly when it is not appropriate to continue an autonomous parking operation of the vehicle.

BRIEF DESCRIPTION OF THE DRAWINGS

FIG. 2 is a flow chart of an automatic parking process;

DESCRIPTION OF THE PREFERRED EMBODIMENT(S)

In the following, an embodiment of the present invention will be described in detail with reference to the drawings.

A parking assist system 1 is mounted on a vehicle such as an automobile provided with a vehicle control system 2 configured to make the vehicle travel autonomously.

Figure 1:
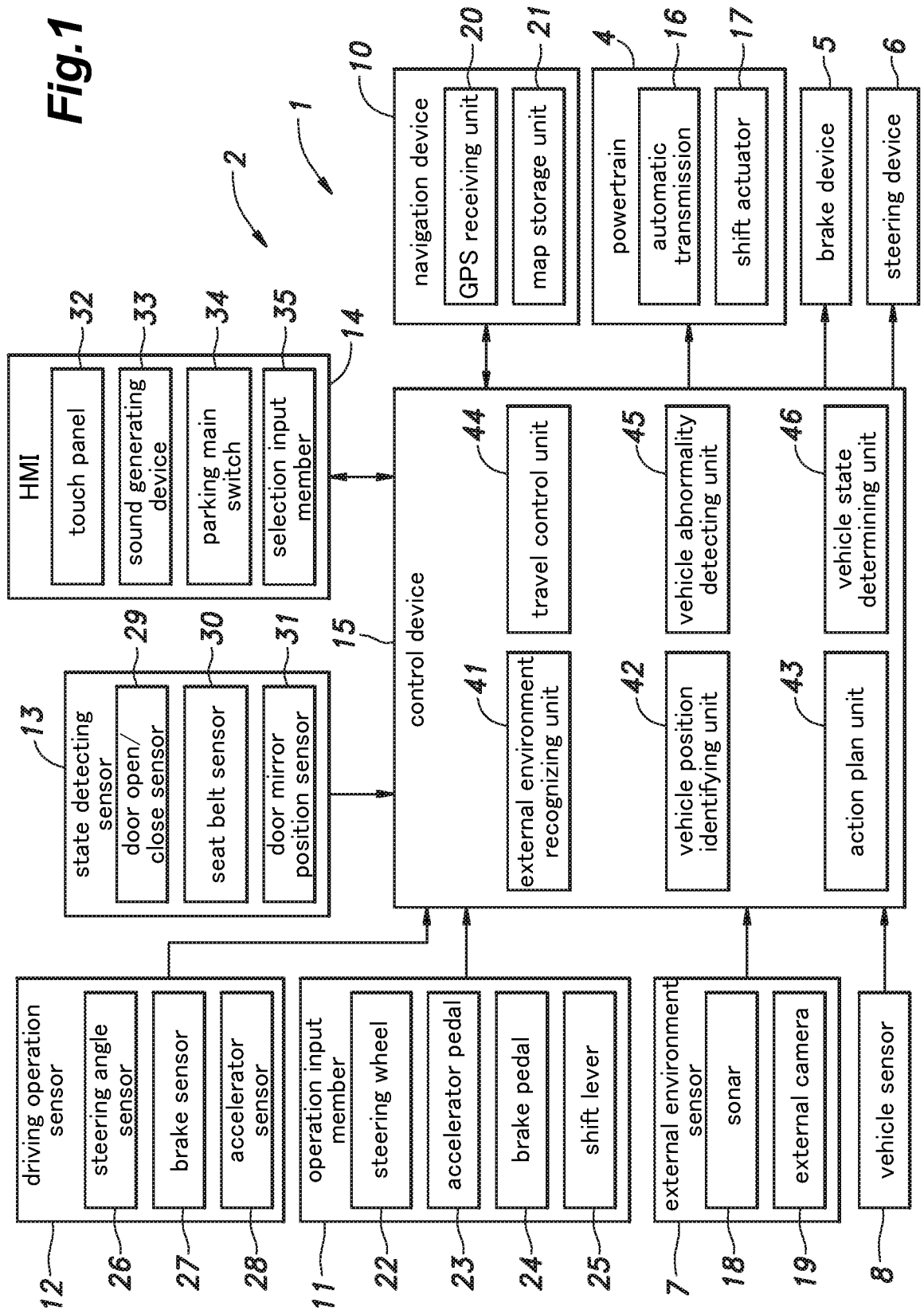
FIG. 1 is a functional block diagram of a vehicle provided with a parking assist system according to an embodiment of the present invention.

As shown in FIG. 1, the vehicle control system 2 includes a powertrain 4, a brake device 5, a steering device 6, an external environment sensor 7, a vehicle sensor 8, a navigation device 10, an operation input member 11, a driving operation sensor 12, a state detecting sensor 13, a human machine interface (HMI) 14, and a control device 15. The above components of the vehicle control system 2 are connected to each other so that signals can be transmitted therebetween via communication means such as a Controller Area Network (CAN).

The powertrain 4 is a device configured to apply a driving force to the vehicle. The powertrain 4 includes a power source and a transmission, for example. The power source includes at least one of an internal combustion engine, such as a gasoline engine and a diesel engine, and an electric motor. In the present embodiment, the powertrain 4 includes an automatic transmission 16 and a shift actuator 17 for changing a shift position of the automatic transmission 16 (a shift position of the vehicle). The brake device 5 is a device configured to apply a brake force to the vehicle. For example, the brake device 5 includes a brake caliper configured to press a brake pad against a brake rotor and an electric cylinder configured to supply an oil pressure to the brake caliper. The brake device 5 may include an electric parking brake device configured to restrict rotations of wheels via wire cables. The steering device 6 is a device for changing a steering angle of the wheels. For example, the steering device 6 includes a rack-and-pinion mechanism configured to steer (turn) the wheels and an electric motor configured to drive the rack-and-pinion mechanism. The powertrain 4, the brake device 5, and the steering device 6 are controlled by the control device 15.

The external environment sensor 7 serves as an external environment information acquisition device for detecting electromagnetic waves, sound waves, and the like from the surroundings of the vehicle to detect an object outside the vehicle and to acquire surrounding information of the vehicle. The external environment sensor 7 includes sonars 18 and external cameras 19. The external environment sensor 7 may further include a millimeter wave radar and/or a laser lidar. The external environment sensor 7 outputs a detection result to the control device 15.

Each sonar 18 consists of a so-called ultrasonic sensor. Each sonar 18 emits ultrasonic waves to the surroundings of the vehicle and captures the ultrasonic waves reflected by an object around the vehicle thereby to detect a position (distance and direction) of the object. Multiple sonars 18 are provided at each of a rear part and a front part of the vehicle. In the present embodiment, two pairs of sonars 18 are provided on a rear bumper so as to be spaced laterally from each other, two pairs of sonars 18 are provided on a front bumper so as to be spaced laterally from each other, one pair of sonars 18 is provided at a front end portion of the vehicle such that the two sonars 18 forming the pair are provided on left and right side faces of the front end portion of the vehicle, and one pair of sonars 18 is provided at a rear end portion of the vehicle such that the two sonars 18 forming the pair are provided on left and right side faces of the rear end portion of the vehicle. That is, the vehicle is provided with six pairs of sonars 18 in total. The sonars 18 provided on the rear bumper mainly detect positions of objects behind the vehicle. The sonars 18 provided on the front bumper mainly detect positions of objects in front of the vehicle. The sonars 18 provided at the left and right side faces of the front end portion of the vehicle detect positions of objects on left and right outsides of the front end portion of the vehicle, respectively. The sonars 18 provided at the left and right side faces of the rear end portion of the vehicle detect positions of objects on left and right outsides of the rear end portion of the vehicle, respectively.

The external cameras 19 are devices configured to capture images around the vehicle. Each external camera 19 consists of a digital camera using a solid imaging element such as a CCD or a CMOS, for example. The external cameras 19 include a front camera for capturing an image in front of the vehicle and a rear camera for capturing an image to the rear of the vehicle. The external cameras 19 may include a pair of left and right side cameras that are provided in the vicinity of the door mirrors of the vehicle to capture images on left and right sides of the vehicle.

The vehicle sensor 8 includes a vehicle speed sensor configured to detect the speed of the vehicle, an acceleration sensor configured to detect the acceleration of the vehicle, a yaw rate sensor configured to detect the angular velocity around a vertical axis of the vehicle, and a direction sensor configured to detect the direction of the vehicle. For example, the yaw rate sensor consists of a gyro sensor.

The navigation device 10 is a device configured to obtain a current position of the vehicle and provides route guidance to a destination and the like. The navigation device 10 includes a GPS receiving unit 20 and a map storage unit 21. The GPS receiving unit 20 identifies a position (latitude and longitude) of the vehicle based on a signal received from an artificial satellite (positioning satellite). The map storage unit 21 consists of a known storage device such as a flash memory or a hard disk, and stores map information.

The operation input member 11 is provided in a vehicle cabin to receive an input operation performed by the occupant (user) to control the vehicle. The operation input member 11 includes a steering wheel 22, an accelerator pedal 23, a brake pedal 24 (brake input member), and a shift lever 25 (a shift member). The shift lever 25 is configured to receive an operation for selecting the shift position of the vehicle.

The driving operation sensor 12 detects an operation amount of the operation input member 11. The driving operation sensor 12 includes a steering angle sensor 26 configured to detect a steering angle of the steering wheel 22, a brake sensor 27 configured to detect a pressing amount of the brake pedal 24, and an accelerator sensor 28 configured to detect a pressing amount of the accelerator pedal 23. The driving operation sensor 12 outputs a detected operation amount to the control device 15.

The state detecting sensor 13 is a sensor configured to detect a change in a state of the vehicle according to an operation by the occupant. The operation by the occupant detected by the state detecting sensor 13 includes an operation indicating an alighting intention (intention to alight from the vehicle) of the occupant and an operation indicating absence of an intention of the occupant to check the surroundings of the vehicle during an autonomous parking operation or an autonomous unparking operation. The state detecting sensor 13 includes, as sensors for detecting the operation indicating the alighting intention, a door open/close sensor 29 configured to detect opening and/or closing of a door of the vehicle and a seat belt sensor 30 configured to detect a fastening state of a seat belt. The state detecting sensor 13 includes, as a sensor to detect the operation corresponding to the abdicating intention, a door mirror position sensor 31 configured to detect a position of a door mirror. The state detecting sensor 13 outputs a signal indicating a detected change in the state of the vehicle to the control device 15.

The HMI 14 is an input/output device for receiving an input operation by the occupant and notifying the occupant of various kinds of information by display and/or voice. The HMI 14 includes, for example, a touch panel 32 that includes a display screen such as a liquid crystal display or an organic EL display and is configured to receive the input operation by the occupant, a sound generating device 33 such as a buzzer or a speaker, a parking main switch 34, and a selection input member 35. The parking main switch 34 receives the input operation by the occupant to execute selected one of an automatic parking process (autonomous parking operation) and an automatic unparking process (autonomous unparking operation). The parking main switch 34 is a so-called momentary switch that is turned on only while a pressing operation (pushing operation) is performed by the occupant. The selection input member 35 receives a selection operation by the occupant related to selection of the automatic parking process and the automatic unparking process. The selection input member 35 may consist of a rotary select switch, which preferably requires pressing as the selection operation.

The control device 15 consists of an electronic control unit (ECU) that includes a CPU, a nonvolatile memory such as a ROM, a volatile memory such as a RAM, and the like. The CPU executes operation processing according to a program so that the control device 15 executes various types of vehicle control. The control device 15 may consist of one piece of hardware, or may consist of a unit including multiple pieces of hardware. Further, the functions of the control device 15 may be at least partially executed by hardware such as an LSI, an ASIC, and an FPGA, or may be executed by a combination of software and hardware.

Further, the control device 15 executes an arithmetic process according to a program and thereby performs a conversion process of an image (video) captured by the external cameras 19 so as to generate a look-down image corresponding to a plan view of the vehicle and its surrounding area and a bird's-eye image corresponding to a three-dimensional image of the vehicle and a part of its surrounding area positioned in the travel direction as viewed from above. The control device 15 may generate the look-down image by combining the images of the front camera, the rear camera, and the left and right side cameras, and may generate the bird's-eye image by combining the image captured by the front camera or the rear camera facing the travel direction and the images captured by the left and right side cameras.

The parking assist system 1 is a system for executing the so-called automatic parking process and the so-called automatic unparking process, in which a vehicle is moved autonomously to a prescribed target position (a target parking position or a target unparking position) selected by the occupant so as to park or unpark the vehicle.

The parking assist system 1 includes the control device 15, the external environment sensor 7 as an external environment acquisition device, the HMI 14 as an input/output device, the driving operation sensor 12 and the state detecting sensor 13 as vehicle state detecting devices, and the brake pedal 24 as a brake input member.

The control device 15 controls the powertrain 4, the brake device 5, and the steering device 6 so as to execute an autonomous parking operation to move the vehicle autonomously to a target parking position and park the vehicle at the target parking position and an autonomous unparking operation to move the vehicle autonomously to a target unparking position and unpark the vehicle at the target unparking position. In order to execute such operations, the control device 15 includes an external environment recognizing unit 41, a vehicle position identifying unit 42, an action plan unit 43, a travel control unit 44, a vehicle abnormality detecting unit 45, and a vehicle state determining unit 46.

The external environment recognizing unit 41 recognizes an obstacle (for example, a parked vehicle or a wall) that is present around the vehicle based on the detection result of the external environment sensor 7, and thereby obtains information about the obstacle. Further, the external environment recognizing unit 41 analyzes the images captured by the external cameras 19 based on a known image analysis method such as pattern matching, and thereby determines whether a wheel stopper or an obstacle is present, and obtains the size of the wheel stopper or the obstacle in a case where the wheel stopper or the obstacle is present. Further, the external environment recognizing unit 41 may compute a distance to the obstacle based on signals from the sonars 18 to obtain the position of the obstacle.

Also, by the analysis of the detection result of the external environment sensor 7 (more specifically, by the analysis of the images captured by the external cameras 19 based on a known image analysis method such as pattern matching), the external environment recognizing unit 41 can acquire, for example, a lane on a road delimited by road signs and a parking space delimited by white lines and the like provided on a surface of a road, a parking lot, and the like.

The vehicle position identifying unit 42 identifies the position of the vehicle (the own vehicle) based on a signal from the GPS receiving unit 20 of the navigation device 10. Further, the vehicle position identifying unit 42 may obtain the vehicle speed and the yaw rate from the vehicle sensor 8, in addition to the signal from the GPS receiving unit 20, and identify the position and posture of the vehicle by the so-called inertial navigation.

The travel control unit 44 controls the powertrain 4, the brake device 5, and the steering device 6 based on a travel control instruction from the action plan unit 43 to make the vehicle travel.

The vehicle abnormality detecting unit 45 detects an abnormality of the vehicle (hereinafter referred to as "vehicle abnormality") based on signals from various devices and sensors. The vehicle abnormality detected by the vehicle abnormality detecting unit 45 includes failure of various devices necessary for driving the vehicle (for example, the powertrain 4, the brake device 5, and the steering device 6) and failure of various sensors necessary for making the vehicle travel autonomously (for example, the external environment sensor 7, the vehicle sensor 8, and the GPS receiving unit 20). Further, the vehicle abnormality includes failure of the HMI 14.

In the present embodiment, the vehicle abnormality detecting unit 45 can detect an abnormality in the screen display of the touch panel 32 based on at least a signal from the touch panel 32.

The vehicle state determining unit 46 acquires the state of the vehicle based on signals from various sensors provided in the vehicle, and determines whether the vehicle is in a prohibition state in which the autonomous movement (namely, the autonomous parking operation or the autonomous unparking operation) of the vehicle should be prohibited. The vehicle state determining unit 46 determines that the vehicle is in the prohibition state when the occupant performs a driving operation (override operation) of the operation input member 11. The override operation is an operation to override (cancel) the autonomous movement (namely, the autonomous parking operation or the autonomous unparking operation) of the vehicle.

More specifically, the vehicle state determining unit 46 may determine the initiation of the override operation when the pressing amount of the brake pedal 24 acquired (detected) by the brake sensor 27 has reached or exceeded a prescribed threshold (hereinafter referred to as "pressing threshold"). Additionally or alternatively, the vehicle state determining unit 46 may determine the initiation of the override operation when a pressing amount of the accelerator pedal 23 acquired (detected) by the accelerator sensor 28 has reached or exceeded a prescribed threshold. The vehicle state determining unit 46 may also determine the initiation of the override operation when a changing rate of the steering angle obtained (detected) by the steering angle sensor 26 has reached or exceeded a prescribed threshold.

Further, the vehicle state determining unit 46 determines, based on the detection result of the state detecting sensor 13, that the vehicle is in the prohibition state when the vehicle is in a state that reflects the alighting intention (intention to alight from the vehicle) of the occupant. More specifically, when the door open/close sensor 29 detects that the door is opened, the vehicle state determining unit 46 determines that the vehicle is in the prohibition state. Also, when the seat belt sensor 30 detects that the seat belt is released, the vehicle state determining unit 46 determines that the vehicle is in the prohibition state.

Further, the vehicle state determining unit 46 determines that, based on the detection result of the state detecting sensor 13, that the vehicle is in the prohibition state when the vehicle is in a state that reflects the absence of intention of the occupant to check the surroundings of the vehicle. More specifically, the vehicle state determining unit 46 determines that the vehicle is in the prohibition state when the door mirror position sensor 31 detects that the door mirror is retracted.

Also, when it is determined, based on the detection result of the state detecting sensor 13, that the door is opened and the seat belt is released, the vehicle state determining unit 46 determines that the alighting intention of the occupant is certain and that the vehicle is in a cancellation state in which the autonomous movement (namely, the autonomous parking operation or the autonomous unparking operation) of the vehicle should be canceled. In addition, the vehicle state determining unit 46 may determine that the vehicle is in the cancellation state when there is an input to a cancellation button displayed on the touch panel 32 while the vehicle is moving autonomously.

In the present embodiment, each vehicle seat provided in the vehicle cabin is provided with a seating sensor configured to detect seating of the occupant. The vehicle state determining unit 46 determines a seating position of the occupant (namely, the vehicle state determining unit 46 identifies the vehicle seat on which the occupant is seated) based on a signal from the seating sensor, and determines that the vehicle is in the cancellation state when the seat belt at the seating position is released and the door near the seating position is opened.

As described above, the driving operation sensor 12 and the state detecting sensor 13 each correspond to the vehicle state detecting device configured to detect the state of the vehicle (for example, the prohibition state in which the autonomous parking operation or the autonomous unparking operation of the vehicle should be prohibited). The vehicle state determining unit 46 determines the state of the vehicle based on the detection results of the driving operation sensor 12 and the state detecting sensor 13. By using the driving operation sensor 12, it is possible to easily detect the override operation of the occupant. By using the state detecting sensor 13, it is possible to easily detect an alighting operation of the user and a change in the state of the vehicle according to an extending/retracting operation of the door mirror.

The action plan unit 43 executes the automatic parking process (autonomous parking operation) or the automatic unparking process (autonomous unparking operation) when the vehicle is in a prescribed state and the HMI 14 or the parking main switch 34 receives a prescribed input by the user, which corresponds to a request for the automatic parking process or the automatic unparking process. More specifically, the action plan unit 43 executes the automatic parking process in a case where a prescribed input corresponding to the automatic parking process is performed when the vehicle is stopped or the vehicle is traveling at a low speed equal to or less than a prescribed vehicle speed (a vehicle speed at which a parking position candidate can be searched for). The action plan unit 43 executes the automatic unparking process (parallel unparking process) in a case where a prescribed input corresponding to the automatic unparking process is performed when the vehicle is stopped. The selection of the process to be executed (the automatic parking process or the automatic unparking process) may be made by the action plan unit 43 based on the state of the vehicle. Alternatively, the above selection may be made by the occupant via the touch panel 32 or the selection input member 35. When executing the automatic parking process, the action plan unit 43 first makes the touch panel 32 display a parking search screen for setting the target parking position. After the target parking position is set, the action plan unit 43 makes the touch panel 32 display a parking screen. When executing the automatic unparking process, the action plan unit 43 first makes the touch panel 32 display an unparking search screen for setting the target unparking position. After the target unparking position is set, the action plan unit 43 makes the touch panel 32 display an unparking screen.

In the following, the automatic parking process will be described with reference to FIG. 2. The action plan unit 43 first executes an acquisition process (step ST1) to acquire one or more parking spaces, if any. More specifically, in a case where the vehicle is stopped, the action plan unit 43 first makes the touch panel 32 of the HMI 14 display a notification that instructs the occupant to move the vehicle straight. While the occupant sitting in the driver's seat (hereinafter referred to as "driver") is moving the vehicle straight, the external environment recognizing unit 41 acquires, based on a signal from the external environment sensor 7, a position and size of each detected obstacle and positions of the white lines provided on the road surface. The external environment recognizing unit 41 extracts, based on the acquired position and size of the obstacle and the acquired positions of the white lines, one or more undelimited parking spaces and one or more delimited parking spaces, if any (hereinafter, the undelimited parking spaces and the delimited parking spaces will be collectively referred to as "parking spaces"). Each undelimited parking space is a space that is not delimited by the white lines or the like, has a size sufficient to park the vehicle, and is available (namely, there is no obstacle therein). Each delimited parking space is a space that is delimited by the white lines or the like, has a size sufficient to park the vehicle, and is available (namely, another vehicle (vehicle other than the own vehicle) is not parked).

Next, the action plan unit 43 executes a trajectory calculation process (step ST2) to calculate a trajectory of the vehicle from a current position of the vehicle to each extracted parking space. In a case where the trajectory of the vehicle can be calculated for a certain parking space, the action plan unit 43 sets the parking space as a parking position candidate where the vehicle can be parked, and make the touch panel 32 display the parking position candidate on the screen (the parking search screen). In a case where the trajectory of the vehicle cannot be calculated due to the presence of the obstacle, the action plan unit 43 does not set the parking space as a parking position candidate and does not make the touch panel 32 display the parking space on the screen. When the action plan unit 43 sets multiple parking position candidates (namely, multiple parking places for which the trajectory of the vehicle can be calculated), the action plan unit 43 makes the touch panel 32 display these parking position candidates.

Figure 3A:
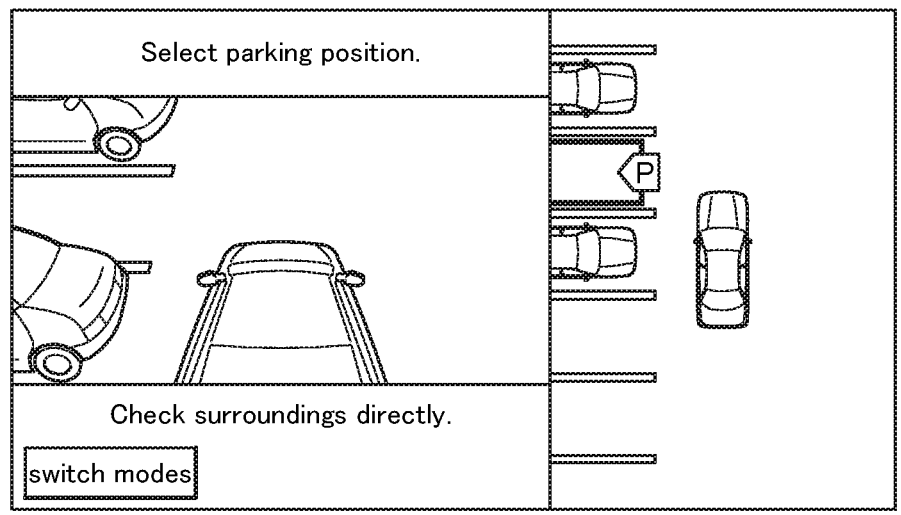
FIG. 3A is a diagram showing a screen display of a touch panel during a target parking position reception process.

Next, the action plan unit 43 executes a target parking position reception process (step ST3) to receive a selection operation performed by the occupant to select the target parking position, which is a parking position where the occupant wants to park the vehicle, and is selected from the one or more parking position candidates displayed on the touch panel 32. More specifically, the action plan unit 43 makes the touch panel 32 display the look-down image and the bird's-eye image in the travel direction on the parking search screen shown in FIG. 3A. When the action plan unit 43 acquires at least one parking position candidate, the action plan unit 43 makes the touch panel 32 display a frame that indicates the parking position candidate and an icon that corresponds to the frame in at least one of the look-down image and the bird's-eye image (in the look-down image in FIG. 3A) in an overlapping manner. The icon consists of a symbol indicating the parking position candidate (see "P" in FIG. 3A). Also, the action plan unit 43 makes the touch panel 32 display the parking search screen including a notification that instructs the driver to stop the vehicle and select the target parking position, so that the touch panel 32 receives the selection operation of the target parking position. The selection operation of the target parking position may be performed via the touch panel 32, or may be performed via the selection input member 35.

Figure 3B:
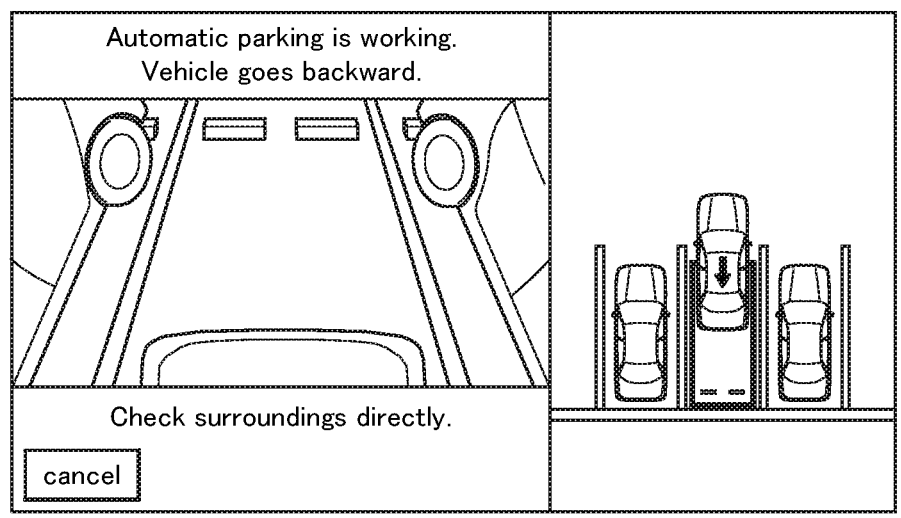
FIG. 3B is a diagram showing the screen display of the touch panel during a driving process.

After the vehicle is stopped and the target parking position is selected by the driver, the action plan unit 43 makes the touch panel 32 switch the screen from the parking search screen to the parking screen. As shown in FIG. 3B, the parking screen is a screen in which an image in the travel direction of the vehicle (hereinafter referred to as "travel direction image") is displayed on the left half of the touch panel 32 and the look-down image including the vehicle and its surrounding area is displayed on the right half thereof. At this time, the action plan unit 43 may make the touch panel 32 display a thick frame that indicates the target parking position selected from the parking position candidates and an icon that corresponds to the thick frame such that the thick frame and the icon overlap with the look-down image. This icon consists of a symbol indicating the target parking position, and is shown in a color different from the symbol indicating the parking position candidate.

After the target parking position is selected and the screen of the touch panel 32 is switched to the parking screen, the action plan unit 43 executes a driving process (step ST4) to make the vehicle travel along the calculated trajectory. At this time, the action plan unit 43 controls the vehicle based on the position of the vehicle acquired by the GPS receiving unit 20 and the signals from the external cameras 19, the vehicle sensor 8, and the like so that the vehicle travels along the calculated trajectory. At this time, the action plan unit 43 controls the powertrain 4, the brake device 5, and the steering device 6 so as to execute a switching operation for switching the travel direction of the vehicle (a reversing operation for reversing the travel direction of the vehicle). The switching operation may be executed repeatedly, or may be executed only once.

During the driving process, the action plan unit 43 may acquire the travel direction image from the external cameras 19 and make the touch panel 32 display the acquired travel direction image on the left half thereof. For example, as shown in FIG. 3B, when the vehicle is moving backward, the action plan unit 43 may make the touch panel 32 display an image to the rear of the vehicle captured by the external cameras 19 on the left half thereof. While the action plan unit 43 is executing the driving process, the surrounding image of the vehicle (the own vehicle) in the look-down image displayed on the right half of the touch panel 32 changes along with the movement of the vehicle. When the vehicle reaches the target parking position, the action plan unit 43 stops the vehicle and ends the driving process.

Figure 3C:
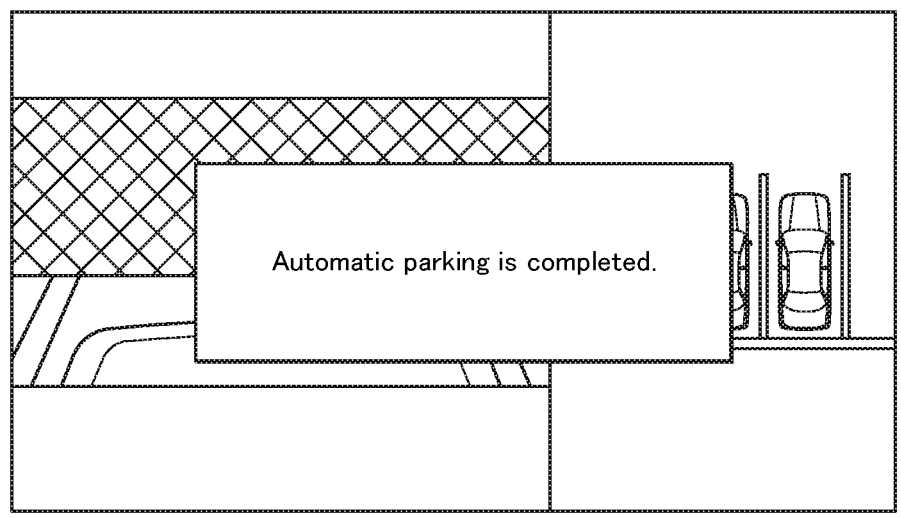
FIG. 3C is a diagram showing the screen display of the touch panel when automatic parking is completed.

When the driving process ends, the action plan unit 43 executes a parking process (step ST5). In the parking process, the action plan unit 43 first drives the shift actuator 17 to set the shift position (shift range) to a parking position (parking range). Thereafter, the action plan unit 43 drives the parking brake device, and makes the touch panel 32 display a pop-up window (see FIG. 3C) indicating that the automatic parking of the vehicle has been completed. The pop-up window may be displayed on the screen of the touch panel 32 for a prescribed period. Thereafter, the action plan unit 43 may make the touch panel 32 switch the screen to an operation screen of the navigation device 10 or a map screen.

In the parking process, there may be a case where the shift position cannot be changed to the parking position because of an abnormality of the shift actuator 17 or a case where the parking brake device cannot be driven because of an abnormality of the parking brake device. In these cases, the action plan unit 43 may make the touch panel 32 display the cause of the abnormality on the screen thereof.

Next, details of the driving process executed by the action plan unit 43 will be described with reference to FIG. 4.

Figure 4:
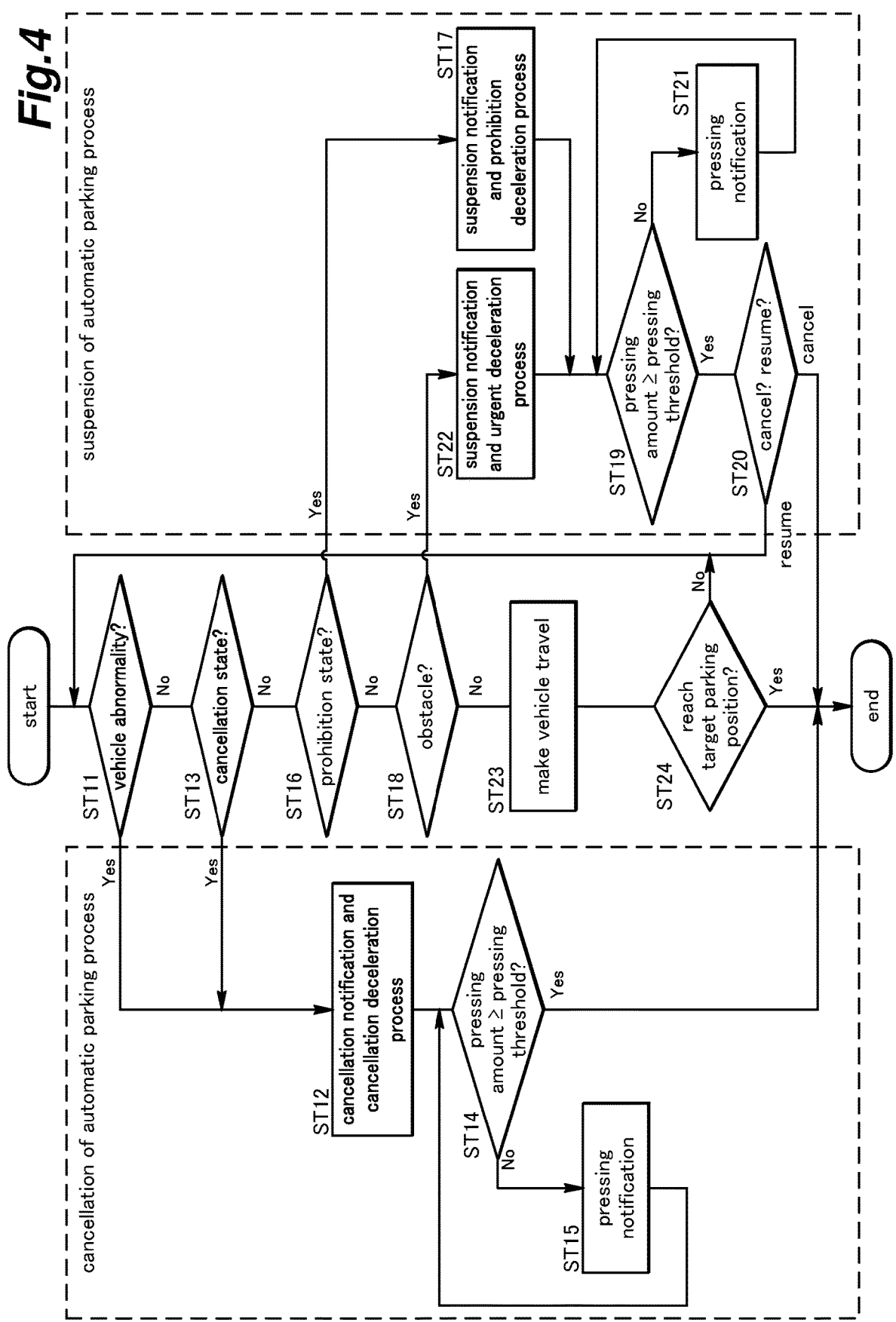
FIG. 4 is a flow chart of the driving process.

As shown in FIG. 4, in the first step ST11 of the driving process, the action plan unit 43 determines whether the vehicle abnormality detecting unit 45 detects a vehicle abnormality such as an abnormality in the screen display of the touch panel 32. Step ST12 is executed if a vehicle abnormality is detected, otherwise step ST13 is executed.

Figure 5A:
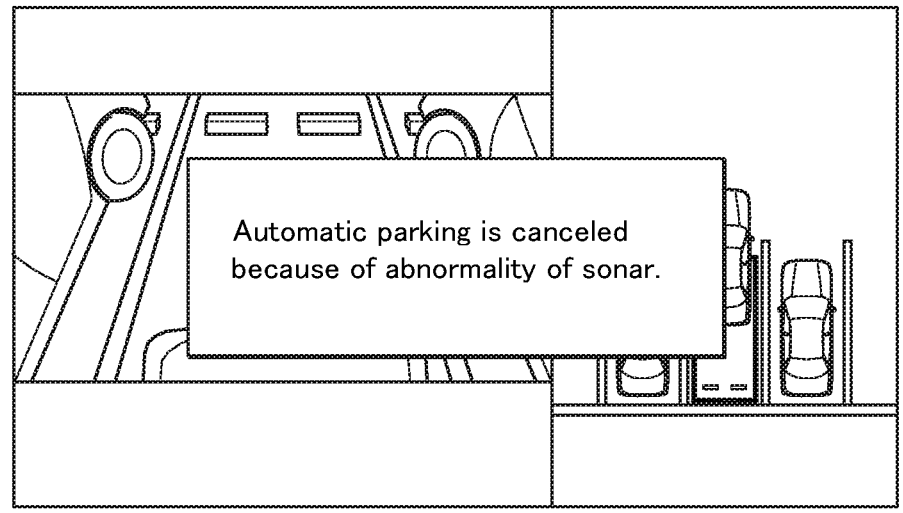
FIG. 5A is a diagram showing the screen display of the touch panel including a cancellation notification that the automatic parking has been canceled.
Figure 6:
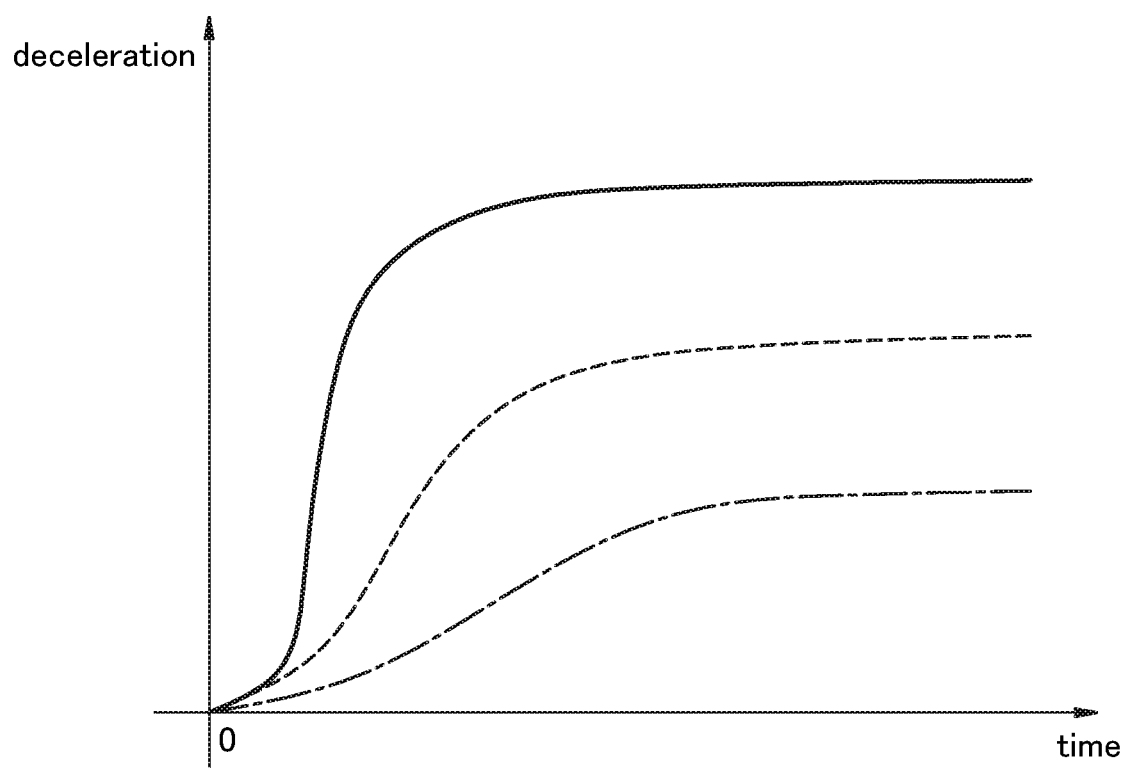
FIG. 6 is a graph showing time changes of deceleration of the vehicle at the start thereof, in a case where an urgent deceleration process is executed (a solid line), in a case where a cancellation deceleration process or a prohibition deceleration process is executed (a broken line), and in a case other than the above two cases (one-dot chain line)

In step ST12, the action plan unit 43 makes the touch panel 32 display a pop-up window including a cancellation notification that the automatic parking process is canceled (see FIG. 5A). At this time, the action plan unit 43 may make the touch panel 32 display the cause of the cancellation of the automatic parking process (for example, an abnormality of the sonar 18 or the like) in the pop-up window. At the same time, the action plan unit 43 makes the sound generating device 33 generate a warning sound or a voice notifying that the automatic parking process is canceled. Thereafter, the action plan unit 43 executes a cancellation deceleration process to decelerate the vehicle so as to stop the vehicle. More specifically, in the cancellation deceleration process, the action plan unit 43 decelerates the vehicle at a prescribed deceleration (hereinafter referred to as "normal deceleration upper limit") or less. FIG. 6 illustrates a time change of the deceleration at this time with a broken line. At this time, the action plan unit 43 limits a change rate of the deceleration (namely, a jerk) to a prescribed upper limit (hereinafter referred to as "normal change rate upper limit") or less. The action plan unit 43 executes step ST14 when the vehicle speed becomes sufficiently low.

In step ST14, the action plan unit 43 acquires the pressing amount of the brake pedal 24, and determines whether the pressing amount of the brake pedal 24 is equal to or more than the pressing threshold. When the pressing amount of the brake pedal 24 is equal to or more than the pressing threshold, the driving process ends. When the pressing amount of the brake pedal 24 is less than the pressing threshold (that is, when the pressing of the brake pedal 24 is insufficient), the action plan unit 43 executes step ST15.

Figure 5B:
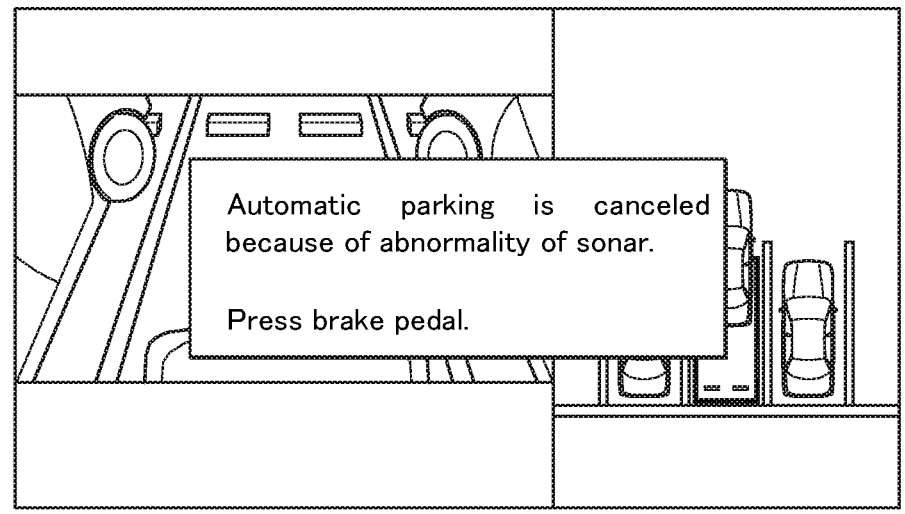
FIG. 5B is a diagram showing the screen display of the touch panel including a pressing notification to urge the driver to press the brake pedal.

In step ST15, the action plan unit 43 makes the touch panel 32 of the HMI 14 display a pressing notification to urge the driver to press the brake pedal 24. In the present embodiment, the action plan unit 43 makes the touch panel 32 display the pressing notification in the pop-up window including the cancellation notification that the automatic parking process is canceled (see FIG. 5B). At this time, the action plan unit 43 may urge the driver to press the brake pedal 24 by making the sound generating device 33 generate a warning sound or a voice. When the pressing notification is completed, the action plan unit 43 executes step ST14.

In step ST13, the vehicle state determining unit 46 determines whether the state of the vehicle is the cancellation state. The action plan unit 43 executes step ST12 in a case where it is determined that the state of the vehicle is in the cancellation state, and otherwise the action plan unit 43 executes step ST16.

In step ST16, the vehicle state determining unit 46 determines whether the state of the vehicle is the prohibition state. The action plan unit 43 executes step ST17 in a case where it is determined that the state of the vehicle is in the prohibition state, and otherwise the action plan unit 43 executes step ST18.

Figure 7A:
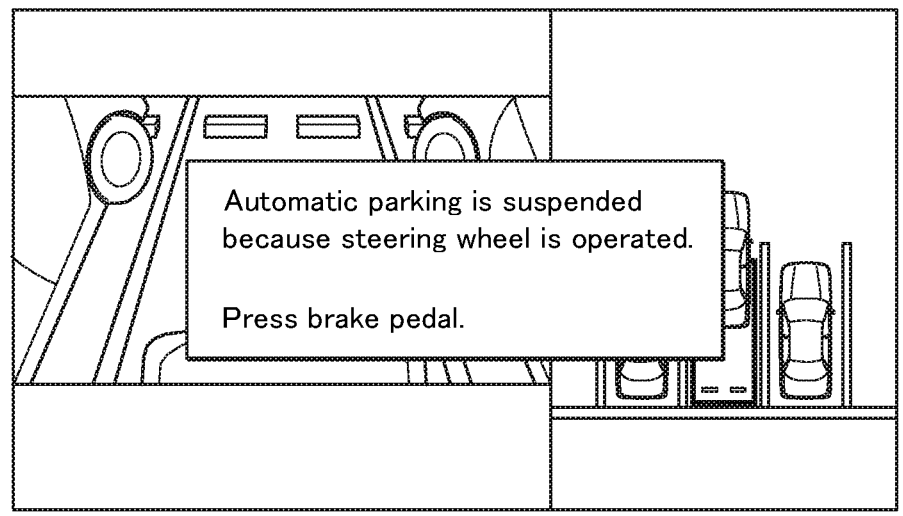
FIG. 7A is a diagram showing the screen display of the touch panel including a suspension notification that the automatic parking has been suspended and a pressing notification to urge the driver to press the brake pedal.

In step ST17, the action plan unit 43 makes the touch panel 32 display a pop-up window including a suspension notification that the automatic parking process is suspended. At this time, the action plan unit 43 may make the touch panel 32 display the cause of the suspension of the automatic parking process (for example, detection of the operation on the steering wheel 22) in the pop-up window (see FIG. 7A). Thereafter, the action plan unit 43 executes a prohibition deceleration process, which is the same as the cancellation deceleration process in step ST12, to decelerate the vehicle so as to stop the vehicle. The action plan unit 43 executes step ST19 when the vehicle speed becomes sufficiently low.

In step ST19, the action plan unit 43 acquires the pressing amount of the brake pedal 24, and determines whether the pressing amount of the brake pedal 24 is equal to or more than the pressing threshold. When the pressing amount of the brake pedal 24 is equal to or more than the pressing threshold, the action plan unit 43 executes step ST20. When the pressing amount of the brake pedal 24 is less than the pressing threshold, the action plan unit 43 executes step ST21.

Figure 7B:
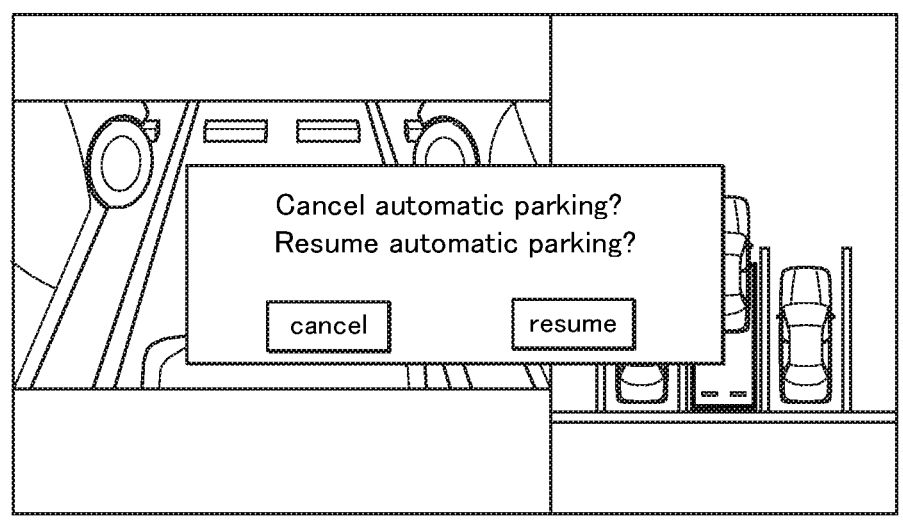
FIG. 7B is a diagram showing the screen display of the touch panel including a pop-up window that includes a cancellation button and a resumption button.

In step ST20, the action plan unit 43 makes the touch panel 32 display a pop-up window including a cancellation button and a resumption button (see FIG. 7B). When an input (touch) to the cancellation button is detected on the touch panel 32, the action plan unit 43 ends the driving process and executes the parking process. When an input to the resumption button is detected on the touch panel 32, the action plan unit 43 executes the first step ST11 of the driving process.

In step ST21, the action plan unit 43 makes the touch panel 32 display the pressing notification to urge the driver to press the brake pedal 24. At this time, when the pop-up window including the suspension notification that the automatic parking process is suspended is displayed on the touch panel 32, the action plan unit 43 may make the touch panel 32 display the pressing notification in the pop-up window (see FIG. 7A). When the display of the pressing notification is completed, the action plan unit 43 executes step ST19.

In step ST18, the action plan unit 43 determines a travel direction of the vehicle and a distance to be traveled (travel distance) for a prescribed time (hereinafter referred to as "travel time") based on the calculated trajectory. The action plan unit 43 may determine the travel distance based on a product of the vehicle speed and the travel time. Thereafter, the action plan unit 43 determines presence/absence of an obstacle within the travel distance based on the travel direction image captured by the external cameras 19 and the signals from the sonars 18. When the action plan unit 43 determines that the obstacle is present in the travel direction of the vehicle within the travel distance, that is, when the action plan unit 43 determines that a collision may occur if the vehicle moves by the travel distance, the action plan unit 43 executes step ST22. When the action plan unit 43 determines that no obstacle is present in the travel direction of the vehicle within the travel distance, the action plan unit 43 executes step ST23.

In step ST22, as in step ST17, the action plan unit 43 makes the touch panel 32 display a pop-up window including the suspension notification that the automatic parking process is suspended. Thereafter, the action plan unit 43 executes an urgent deceleration process to decelerate the vehicle so as to stop the vehicle. In the urgent deceleration process, the action plan unit 43 decelerates the vehicle at a prescribed deceleration (hereinafter referred to as "urgent deceleration upper limit") or less. FIG. 6 illustrates a time change of the deceleration at this time with a solid line. At this time, the action plan unit 43 limits a change rate of the deceleration to a prescribed upper limit (hereinafter referred to as "urgent change rate upper limit") or less. The urgent deceleration upper limit is set to be larger than the normal deceleration upper limit. Also, the urgent change rate upper limit is set to be larger than the normal change rate upper limit. The action plan unit 43 executes step ST19 when the vehicle speed becomes sufficiently low.

Figure 7C:
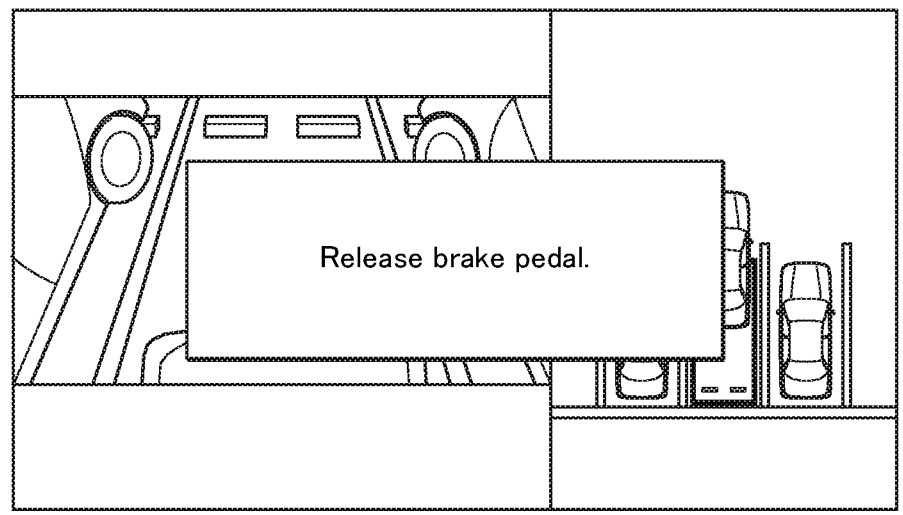
FIG. 7C is a diagram showing the screen display of the touch panel including a releasing notification to urge the driver to release the brake pedal when the automatic parking is resumed.

In step ST23, the action plan unit 43 makes the vehicle travel along the calculated trajectory for the travel time so as to move the vehicle by the travel distance. During the movement of the vehicle, as shown in FIG. 3B, the action plan unit 43 may make the touch panel 32 display the cancellation button to cancel the automatic parking process together with the bird's-eye image and the look-down image. In step ST23, the action plan unit 43 may prohibit the vehicle from moving when the brake pedal 24 is pressed, and may make the touch panel 32 display a releasing notification to urge the driver to release the brake pedal 24 (see FIG. 7C). Thereby, the driver can easily understand that the movement of the vehicle will be resumed when the driver releases the brake pedal 24.

In step ST23, when the distance to the target parking position becomes equal to or less than a prescribed threshold or when the distance to a stop position where the vehicle should stop in the switching operation becomes equal to or less than a prescribed threshold, the action plan unit 43 executes a movement deceleration process to decelerate the vehicle so as to stop the vehicle at the target parking position or the stop position. The action plan unit 43 sets the upper limit of the deceleration of the vehicle in this movement deceleration process (that is, the upper limit of the deceleration of the vehicle to stop the vehicle at the target parking position or the stop position) to a movement deceleration upper limit, which is set in consideration of safety. The movement deceleration upper limit is set to a value smaller than the normal deceleration upper limit. Further, the action plan unit 43 sets the upper limit of the change rate of the deceleration of the vehicle in this movement deceleration process to a prescribed movement change rate upper limit. The movement change rate upper limit is set to a value smaller than the normal change rate upper limit. FIG. 6 illustrates a time change of the deceleration when the distance to the target parking position is equal to or less than the prescribed threshold with a one-dot chain line. After making the vehicle travel along the calculated trajectory for the travel time, the action plan unit 43 executes step ST24.

In step ST24, the action plan unit 43 acquires the position of the vehicle, and determines whether the position of the vehicle matches the target parking position, that is, whether the vehicle has reached the target parking position. When the vehicle has reached the target parking position, the action plan unit 43 drives the brake device 5 to stop the vehicle at the target parking position. When the vehicle has not reached the target parking position, the action plan unit 43 executes the first step ST11 of the driving process.

Next, the operation of the parking assist system 1 configured as described above will be further described. In the parking assist system 1, as shown in the left half of FIG. 4, when the vehicle abnormality is detected (Yes in step ST11) or when the state of the vehicle is the cancellation state (Yes in step ST13) during the automatic parking process, the vehicle is decelerated and stopped after the touch panel 32 displays the cancellation notification that the automatic parking process is canceled (step ST12). Thereafter, in a case where the brake pedal 24 is not sufficiently pressed, the touch panel 32 displays the pop-up window including the pressing notification to urge the driver to press the brake pedal 24. When the brake pedal 24 is pressed, the driving process is completed and the parking process is executed. During the parking process, the action plan unit 43 controls the shift actuator 17 to set the shift position to the parking position. Thereafter, the action plan unit 43 operates the parking brake device to fix the vehicle. As described above, in the driving process, when the vehicle abnormality including the abnormality of the touch panel 32 is detected or when the state of the vehicle is the cancellation state (more specifically, when the seat belt is released and the door is opened or when there is an input to the cancellation button displayed on the touch panel 32 during the movement of the vehicle), the driving operation is canceled.

As shown in the right half of FIG. 4, when the state of the vehicle is the prohibition state (Yes in step ST16) or when the action plan unit 43 determines that there is an obstacle (Yes in step ST18), the vehicle is decelerated and stopped after the touch panel 32 displays the suspension notification that the automatic parking process is suspended (step ST17, ST22). Thereafter, if the brake pedal 24 is not sufficiently pressed, the touch panel 32 displays the pop-up window including the pressing notification to urge the driver to press the brake pedal 24. When the brake pedal 24 is pressed, the touch panel 32 displays the resumption button and the cancellation button so as to be able to receive an input to resume the driving process (step ST20). When the resumption button is pressed, the action plan unit 43 executes the first step ST11 of the driving process, so that the driving process is resumed. When the cancellation button is pressed, the driving process ends and the parking process is executed to fix the vehicle. Thus, during the driving process, when the vehicle is in the prohibition state or when the action plan unit 43 determines that there is an obstacle, the driving process is suspended.

When the vehicle abnormality is not detected (No in step ST11), the state of the vehicle is not the cancellation state nor the prohibition state (No in step ST13 and ST16), and the action plan unit 43 determines that there is no obstacle (No in step ST18), the vehicle continues traveling until the vehicle reaches the target parking position (step ST23). When the vehicle reaches the target parking position (Yes in step ST24), the driving process ends, and then the parking process is executed to fix the vehicle.

Next, the effects of the parking assist system 1 configured as described above will be described. When the vehicle is in the cancellation state or the prohibition state and the autonomous parking operation of the vehicle should be prohibited, the action plan unit 43 executes the cancellation deceleration process or the prohibition deceleration process to decelerate the vehicle so as to stop the vehicle (step ST12, ST17). The deceleration of the vehicle at this time is limited to the normal deceleration upper limit or less, and the change rate of the deceleration of the vehicle at this time is limited to the normal change rate upper limit or less.

The normal deceleration upper limit is set to a value larger than the movement deceleration upper limit. That is, the normal deceleration upper limit is larger than the upper limit of the deceleration when the vehicle is decelerated to stop at the target parking position, and is larger than the upper limit of the deceleration when the vehicle is decelerated to stop at the stop position during the switching operation. Accordingly, when the vehicle is in the cancellation state or the prohibition state in which the autonomous parking operation of the vehicle should be prohibited, the vehicle can be decelerated at the deceleration greater than the deceleration in the movement deceleration process (namely, the deceleration set in consideration of safety). Therefore, when the autonomous parking operation of the vehicle should be prohibited, the vehicle can be decelerated quickly.

The normal change rate upper limit is set to a value larger than the movement change rate upper limit. That is, the normal change rate upper limit is larger than the upper limit of the change rate of the deceleration to stop the vehicle at the target parking position or the stop position in the switching operation. Accordingly, as shown in FIG. 6, when the autonomous parking operation of the vehicle should be prohibited (see the broken line), it is possible to increase the deceleration more quickly, compared with a time when the vehicle is decelerated to stop at the target parking position or the stop position in the switching operation (see the one-dot chain line). That is, when the autonomous parking operation of the vehicle should be prohibited, the vehicle can be decelerated at the deceleration greater than the deceleration to stop the vehicle at the target parking position or the stop position in the switching operation (namely, the deceleration set in consideration of safety). Accordingly, when the autonomous parking operation of the vehicle should be prohibited, the vehicle can be decelerated more quickly.

As the change rate of the deceleration becomes larger, the increase of the deceleration becomes steeper, so that the occupant may feel uncomfortable. In the present embodiment, the upper limit of the change rate of the deceleration to stop the vehicle at the target parking position or the stop position in the switching operation is smaller than the upper limit of the change rate of the deceleration when the automatic parking process is suspended. Accordingly, when the vehicle is decelerated to stop at the target parking position or the stop position in the switching operation, the change rate of the deceleration is limited compared with the time when the automatic parking process is suspended, so that the comfort of the vehicle is improved.

In a case where the state detecting sensor 13 detects that the door is opened and the seat belt is released, the vehicle is in the cancellation state (Yes in step ST13). In such a case, the action plan unit 43 decelerates the vehicle so as to stop the vehicle. Thereafter, when the brake pedal 24 is pressed (Yes in step ST14), the driving process ends and the parking process is executed to fix the vehicle. Accordingly, when the occupant releases the seat belt and opens the door to alight from the vehicle, the vehicle stops and the automatic parking process is canceled. Therefore, the safety of the vehicle is improved.

In a case where the input to the cancellation button displayed on the touch panel 32 is performed during the movement of the vehicle, the vehicle is in the cancellation state (step ST13), so that the vehicle is stopped (step ST12). In this way, the autonomous parking operation can be canceled by the input to the touch panel 32, so that the convenience of the vehicle is improved.

When the obstacle is detected within the travel distance in the travel direction during the automatic parking process (Yes in step ST18), the action plan unit 43 decelerates the vehicle so as to stop the vehicle (step ST22). At this time, the deceleration of the vehicle is limited to the urgent deceleration upper limit or less, and the change rate of the deceleration at this time is limited to the urgent change rate upper limit or less.

The urgent deceleration upper limit is set to a value larger than the normal deceleration upper limit and the movement deceleration upper limit. That is, the upper limit of the deceleration of the vehicle at a time when the obstacle is detected within the travel distance in the travel direction during the autonomous parking operation is set to be larger than the upper limit of the deceleration of the vehicle at a time when the prohibition condition is satisfied or at a time when the vehicle stops at the target parking position. Therefore, when the obstacle is detected within the travel distance in the travel direction (when there is a possibility of a collision with the obstacle), the vehicle can be decelerated quickly.

The urgent change rate upper limit is set to a value larger than the normal change rate upper limit and the movement change rate upper limit. Accordingly, as shown in FIG. 6, when the obstacle is detected within the travel distance in the travel direction during the autonomous parking operation, the deceleration can be increased more quickly. Therefore, when the obstacle is detected within the travel distance in the travel direction (when there is a possibility of a collision with the obstacle), the vehicle can be decelerated more quickly.

When the occupant opens the door or releases the seat belt, the action plan unit 43 determines that the vehicle is in the prohibition state (Yes in step ST16) and stops the vehicle (step ST17). Thereafter, when the occupant presses the brake pedal 24 sufficiently (Yes in step ST19), the touch panel 32 displays a resumption button to receive an input as to whether to resume the autonomous parking operation (step ST20). When the occupant performs an input to the resumption button ("resume" in step ST20), the action plan unit 43 resumes the driving process from the first step ST11. In a case where the seat belt is fastened and the door is closed after the driving process is resumed (Yes in step ST13 and ST16), the vehicle is moved and the autonomous parking operation is resumed. As described above, even if the vehicle is in a state where the door is opened or the seat belt is released, the parking operation is not canceled and can be resumed. Thereby, the convenience of the vehicle is improved.

When the occupant opens the door and releases the seat belt to alight from the vehicle, the action plan unit 43 determines that the vehicle is in the cancellation state (Yes in step ST13), and stops the vehicle (step ST12). Thereafter, when the occupant presses the brake pedal 24 sufficiently (Yes in step ST14), the driving process ends, and the parking process is executed to fix the vehicle. In this way, when an operation of releasing the seat belt and opening the door is performed (namely, an operation which reflects the alighting intention of the occupant is performed), the parking operation is canceled. Thereby, it is possible to realize the autonomous parking operation which corresponds to the occupant's intention and is more convenient.

When the pressing of the brake pedal 24 by the occupant is detected (Yes in step ST19), the touch panel 32 receives an input as to whether to resume the automatic parking process (step ST20). That is, on condition that the pressing of the brake pedal 24 is performed, the selection operation to resume the autonomous parking operation becomes possible. Accordingly, the resumption of the driving operation is allowed after the occupant checks the surroundings and takes a posture to stop the vehicle appropriately. Thereby, the safety of the vehicle is improved.

Concrete embodiments of the present invention have been described in the foregoing, but the present invention should not be limited by the foregoing embodiments and various modifications and alterations are possible within the scope of the present invention. In the above embodiment, the automatic parking process is executed by the parking assist system 1, but the present invention is not limited to this embodiment. More specifically, the parking assist system 1 may allow the resumption of the automatic unparking process (driving process) on condition that the brake pedal 24 is pressed when the automatic unparking process is suspended.

In the above embodiment, the pressing notification to urge the driver to press the brake pedal 24 is displayed in the pop-up window to notify the cancellation or suspension of the driving operation, but the present invention is not limited to this embodiment. The pressing notification to urge the driver to press the brake pedal 24 may be displayed on the touch panel 32 as another pop-up window that is different from the pop-up window to notify the cancellation or suspension of the driving operation.

The invention claimed is:

1. A parking assist system, comprising:
a control device configured to control an autonomous parking operation to move a vehicle autonomously to a prescribed target parking position,
a vehicle state detecting device configured to detect a state of the vehicle including a driving operation performed by an occupant, door open/close status, and seat belt fastening status,
an input/output device configured to receive an input by the occupant at least for canceling the autonomous parking operation and to present information to the occupant, and
an external environment information acquisition device configured to acquire surrounding information of the vehicle;
wherein during control of the autonomous parking operation, when the control device determines that (i) the driving operation is performed based on a detection result of the vehicle state detecting device, (ii) a door is opened based on a detection result of the vehicle state detecting device, (iii) a seat belt is released based on a detection result of the vehicle state detecting device or (iv) there is the input to the input/output device to cancel the autonomous parking, the control device executes a cancellation deceleration process to decelerate the vehicle so as to stop the vehicle,
the control device is configured to set an upper limit on deceleration of the vehicle in the cancellation deceleration process to be larger than an upper limit on deceleration of the vehicle in a stop operation to stop the vehicle at the target parking position,
wherein during the control of the autonomous parking operation, when the external environment information acquisition device detects an obstacle in a travel direction of the vehicle, the control device executes an urgent deceleration process to stop the vehicle, and
the control device is configured to set an upper limit on deceleration of the vehicle in the urgent deceleration process to be larger than the upper limit on the deceleration of the vehicle in the cancellation deceleration process.

2. The parking assist system according to claim 1, wherein the control device is configured to set an upper limit on a change rate of the deceleration of the vehicle in the cancellation deceleration process to be larger than an upper limit on a change rate of the deceleration of the vehicle in the stop operation to stop the vehicle at the target parking position.

3. The parking assist system according to claim 1, wherein the control device is configured to set the upper limit on the deceleration of the vehicle in the cancellation deceleration process to be larger than an upper limit on deceleration of the vehicle in a switching operation for switching the travel direction of the vehicle during the parking operation.

4. The parking assist system according to claim 1, wherein the control device is configured to set an upper limit on a change rate of the deceleration of the vehicle in the urgent deceleration process to be larger than an upper limit on a change rate of the deceleration of the vehicle in the cancellation deceleration process.

5. The parking assist system according to claim 1, wherein during the control of the parking operation, when the control device determines that the vehicle is in a state where a door is opened or a seat belt is released based on the detection result of the vehicle state detecting device, the control device stops the vehicle by executing the cancellation deceleration process, and thereafter, the control device allows the autonomous parking operation to resume when the control device determines that the vehicle is in a state where the door is closed and the seat belt is fastened based on the detection result of the vehicle state detecting device.

6. The parking assist system according to claim 1, further comprising a vehicle abnormality detecting unit configured to detect an abnormality of the vehicle,
wherein during the control of the parking operation, when the control device determines that the vehicle is in a state where a door is opened and a seat belt is released based on the detection result of the vehicle state detecting device or the control device determines that the vehicle abnormality is detected based on the vehicle abnormality detecting unit, the control device cancels the parking operation.

7. The parking assist system according to claim 1, further comprising:
a brake input member configured to receive a brake operation of the vehicle by the occupant,
wherein after the control device stops the vehicle by executing the cancellation deceleration process which the control device executes when an override operation for the operation input member is detected, the input/output device receives the input as to whether to resume the parking operation when the brake operation on the brake input member is detected.

8. A parking assist system according to claim 7, wherein the control device does not permit that the input/output device receives the input as to whether to resume the parking operation when the cancellation deceleration process is executed after the vehicle state detecting device detects that the door is open and that the seat belt is released.

9. A parking assist system according to claim 1, further comprising a vehicle abnormality detecting unit configured to detect an abnormality of the vehicle,
wherein during the control of the parking operation, when the control device determines that the vehicle abnormality is detected based on the vehicle abnormality detecting unit, the control device executes the cancellation deceleration process to decelerate the vehicle so as to stop the vehicle.

* * * * *